March 10, 1970　　J. P. CHARRIN ET AL　　3,500,170
D.C.-A.C. CONVERTERS

Filed Nov. 18, 1968　　　　　　　　　　　　3 Sheets-Sheet 1

Inventors:
Jean Pierre Charrin
Jacques Hermier
Michel Georges E. Lalande
By Karl O. Flocks
Attorney

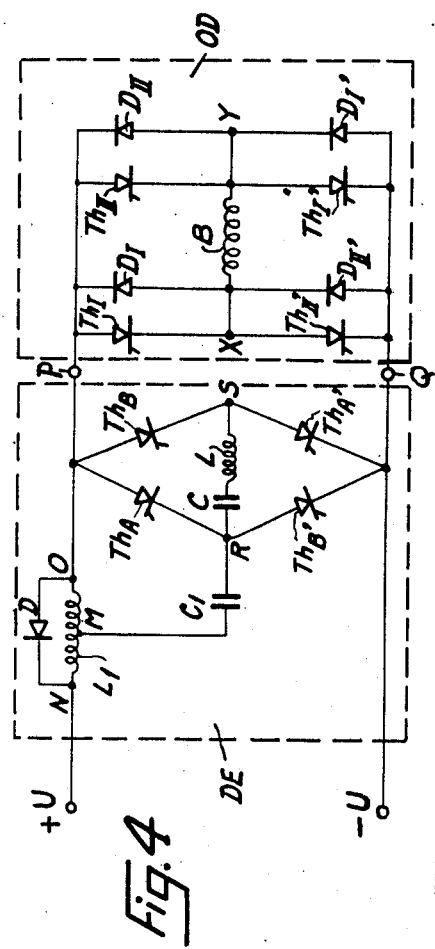
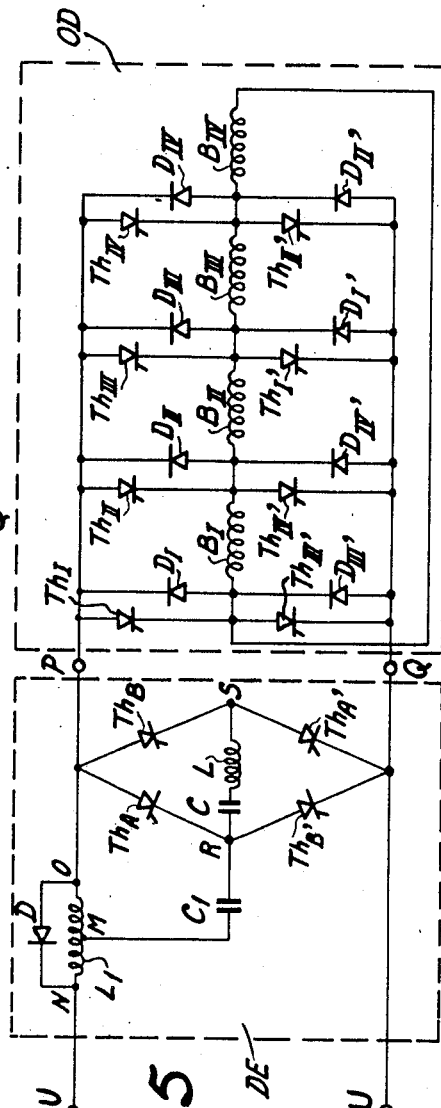

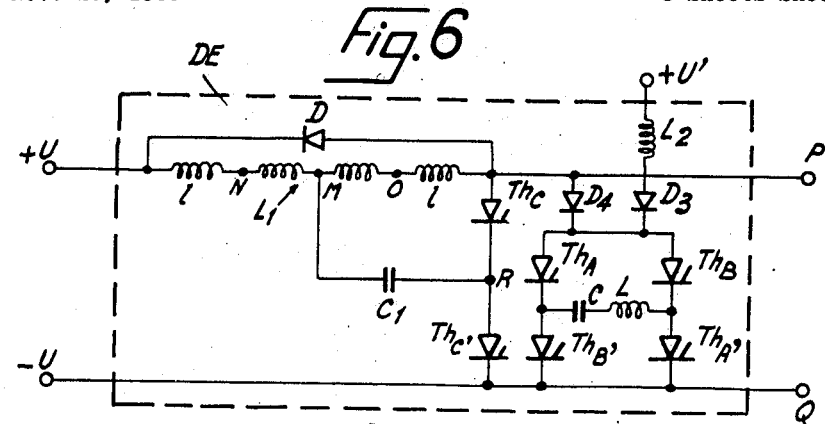
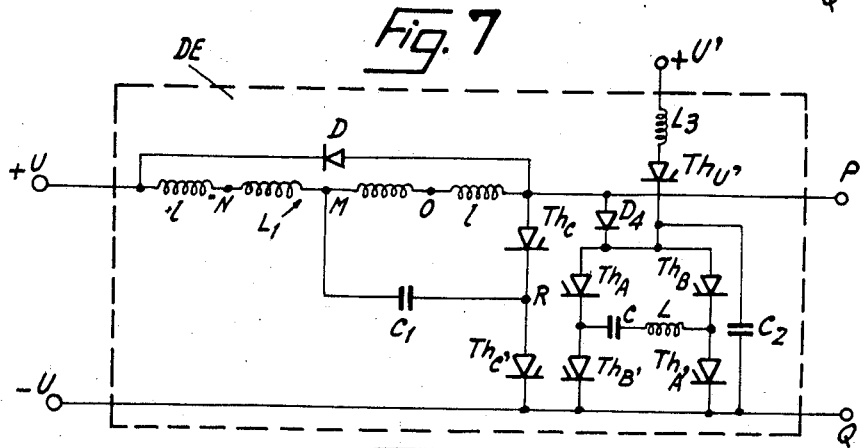
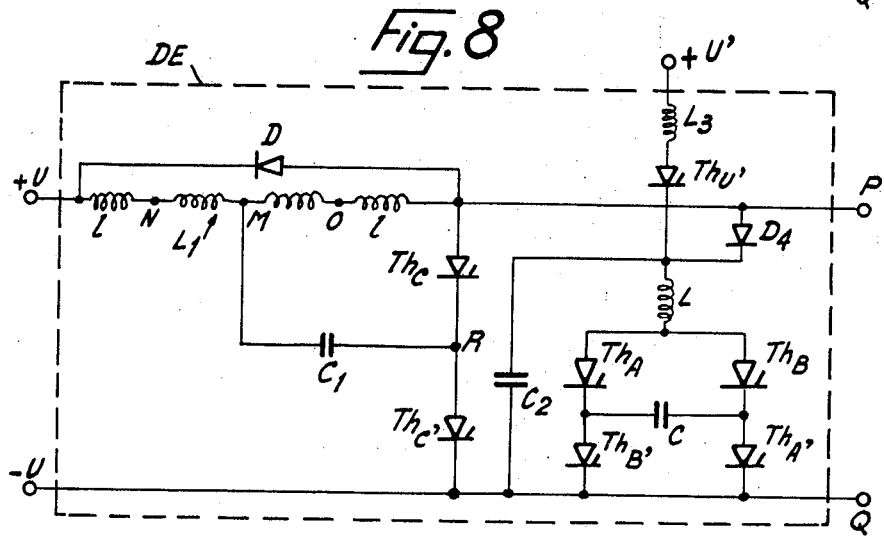

3,500,170
D.C.-A.C. CONVERTERS
Jean Pierre Charrin, Boulogne, Jacques Hermier, Nanterre, and Michel George E. Lalande, le Vesinet, France, assignors to La Telemecanique Electrique Nanterre, Hauts-de-Seine, France, a company of France
Filed Nov. 18, 1968, Ser. No. 776,459
Claims priority, application France, Nov. 20, 1967, 128,826; Oct. 22, 1968, 170,840
Int. Cl. H02m 7/44
U.S. Cl. 321—45     19 Claims

ABSTRACT OF THE DISCLOSURE

A D.C.-A.C. converter includes an extinction circuit co-operating with an inverter network. The extinction circuit includes a series inductor in the supply lead to the inverter and a co-operating capacitor. The cut-off capacity of the extinction circuit is increased by providing the series inductor with at least one intermediate tapping so that the capacitor, one terminal of which is connected to the inductor or a tapping, charges and discharges respectively through different portions of the inductor defined on either side of the tapping to which the capacitor is connected.

---

This invention relates to an D.C.-A.C. converter.

It is known that the supply to an inductive load can be procured by a pulsed direct voltage the variable frequency of which permits the regulation of the mean level or the frequency of the current flowing in the said inductive load. Moreover, if the inductive load of an electrical device comprises several coils, for example three in the case of a three-phase device, it is known to supply each of these coils in succession with suitably switched pulses.

In this connection, converters are already known which comprise controlled semiconductor devices supplying pulses from a direct-voltage source and periodically switching the said coils.

A converter of this type, supplied from a direct-voltage source, comprises, on the one hand, an assembly of controlled semiconductor rectifiers determining the passage of a supply current according to an appropriate sequence into one or more inductive loads, each of the controlled rectifiers being associated with a diode in anti-parallel connection with it and each group of two of these series-connected diodes being arranged so as to block the direct-voltage source and forming a branch of the circuit connecting the two terminals of this source, and, on the other hand, between the said source and the said controlled semiconductor rectifier assembly, a device for extinguishing these rectifiers which comprises at least one capacitor and an assembly of controlled semiconductor elements connected across the terminals of the source via a series-inductor and serving as a charging switch for the said capacitor, this circuit branch forming part of the discharge circuit for the extinction device.

The series-inductor may be provided with a "return" diode across its terminals, the purpose of this diode being to return to the source the current circulating in the coils, so that overvoltages are avoided.

In a converter of this type the said capacitor is charged up each time an inductive load (or loads) is supplied and, in order to produce the current for extinguishing those semiconductor rectifiers which had fired during the said supply period, discharges every time the supply current attains a predetermined amplitude, the result being a pulsed direct current supply.

It is well known that these controlled rectifiers are not extinguished spontaneously when the command triggering them into conduction disappears and that the extinction can only be obtained by lowering the current passing through them to below a certain threshold.

Now, if in a converter of the type referred to the said capacitor discharges the discharge circuit branch behind the series-inductor and parallel with the direct voltage supply source begins to conduct and constitutes an almost perfect short-circuit.

Consequently, the total source voltage will, at this instant, be applied across the terminals of the said series-inductor, and this must lead to a rise in the level of current supplied from the source to the rectifiers. Moreover, this current rise adds itself to the discharge current of the capacitor.

Thus, the level of the current passing through two of the controlled bridge rectifiers is, at the moment of extinction, more than twice that of the current which flowed in the controlled rectifiers supplying the load before the extinction command was given. To extinguish these rectifiers, the capacitor would therefore have to supply increased energy. Thus, the cut-off capacity of such a converter is limited.

Moreover, the series-inductor must have a high value, in order to limit the current rise. However, this inductor is connected in series with the inductive load and therefore limits the increase of the supply current for this load when the latter begins to flow.

According to the present invention an D.C.-A.C. converter comprises an inverter network of semiconductor controlled rectifiers for supplying an inductive load or loads, and an extinction circuit including an inductor in series with one of the supply leads to the inverter, a capacitor connected at one end to an intermediate tapping on the inductor, and semiconductor controlled rectifier switching arranged to permit alternately charging of the capacitor from the supply, and its discharge, through the two respective portions of the inductor on either side of the intermediate tapping.

Thus, arranged between the series inductor and the semiconductor assembly, the said first capacitor plays an important part in being charged and discharged every time the controlled semiconductor rectifiers of the load-supplying unit are switched.

As will be seen later, this causes, during the charging period, an overvoltage in that portion of the series inductor winding which is situated on the supply side, so as to cancel the current in the other portion of the winding; during the discharge which is absorbed by the portion of the winding situated on the side of the controlled rectifier assembly, an overvoltage is produced which cancels the current in the other portion of the series-inductor winding on the supply side, so that the inductive load is consecutively separated from the supply source as two switching operations are performed.

In a first embodiment of the converter according to the invention the two portions of the series-inductor are tightly coupled magnetically, and the extinction circuit only comprises two controlled semiconductor elements in series connecting that terminal of the series-inductor remote from the corresponding source terminal to the other source terminal, the second end of the capacitor being connected to the common point of the controlled semiconductor elements.

The series-inductor assumes the function of an autotransformer, and the assembly composed of the said series inductor and the first capacitor is capable not only of isolating the load from the source during the switching of the controlled rectifiers supplying this load, but also to supply the necessary energy for extinguishing these rectifiers.

In a second embodiment of the converter according to the invention, the above-mentioned functions of isolation and extinction are split between the first capacitor and a second capacitor. To this purpose, the semiconductor controlled rectifier switching comprises a bridge composed of four semiconductor controlled rectifiers in which the latter are arranged so as to pass source current and one of the diagonals of which is connected across the terminals of the source via the series inductor while its other diagonal includes at least one second capacitor, the said series capacitor being arranged between a tapping of the series inductor and one of the ends of the bridge diagonal including the second capacitor.

Moreover, if the load to be supplied necessitates a source capable of furnishing a direct voltage fluctuating between wide limits, the above-mentioned converters of the invention, operating with a single source, are no longer sufficient, as will be explained below.

Thus, according to another embodiment of the invention, a converter intended for applications requiring the variation within wide limits of the direct-voltage produced by a variable supply in order suitably to feed the inductive load or loads, includes a supplementary source supplying a constant direct voltage and the extinction circuit comprises, on the one hand, two controlled semiconductor elements in series, connected in parallel with the variable supply via the series inductor, the first capacitor being connected between the common point of these two elements and a tapping of the series inductor, and comprises, on the other hand, between these two elements and the inverter, a bridge comprising four controlled semiconductor elements arranged so as to pass current from both the variable and the constant source, one diagonal of this bridge being connected across the terminals of the two sources by means of unidirectional elements avoiding that one of the sources passes current to the other, while the other diagonal of the bridge comprises at least a second capacitor co-operating advantageously with an auxiliary inductor, in order to provide a series resonant circuit.

Thus, the series inductor and the first capacitor, which are supplied by the variable source, are capable of isolating the load or loads from the said source during the switching operations, whereas the above-mentioned series resonant circuit is charged so as to extinguish the controlled rectifiers which supply the said load or loads.

The invention will now be described in greater detail, with reference to the accompanying drawings, of which:—

FIGURE 4 shows another example of a converter according to the invention which supplies the armature of a direct current motor;

FIGURE 5 shows a converter according to the invention supplying a variable-reluctance motor of known type; and FIGURES 6, 7 and 8 show other examples of the extinction device for converters according to the invention, suitable for supplying loads which necessitate pronounced supply voltage variations.

In the various drawings the same elements have been referred to by identical reference symbols and numerals.

Figure 1:
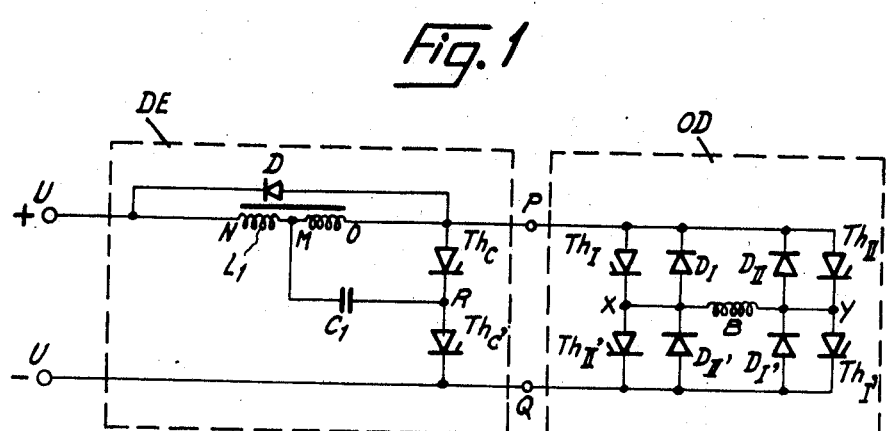
FIGURE 1 shows an example of the converter of the invention which supplies the armature of a direct current motor.

The converter of the invention shown in FIGURE 1 comprises an inverter OD having thyristors, and a device DE for extinguishing the latter.

The extinction device DE comprises, for example, two thyristors T$h$c and T$h$c', arranged in series between two points P and Q in such a way that the anode of T$h$c is adjacent to P and the cathode of T$h$c' adjacent the point Q, whereas the cathode of T$h$c is connected to the anode of T$h$c' at point R.

The two points P and Q are connected respectively to the terminals +U and —U of a direct voltage source U, point P being connected to the +U terminal via an inductor L$_1$, and between the terminals N and O of this inductor may be arranged a "return" diode D, whereas point Q is directly connected to the —U terminal.

The inductor L$_1$ has an intermediate tapping M, approximately in the centre, which is connected to point R via a capacitor C$_1$. The exact placing of the point M can be determined by the equations for the various transient regimes of the circuit parts relevant to capacitor C$_1$.

In the deliberately simplified example shown in FIGURE 1, the inverter OD, connected to the extinction device across points P and Q, supplies the armature B of a direct current motor. Obviously, the inverter OD and its load may be of more complex configuration (see later) than that shown in FIGURE 1, without thereby departing from the scope of the present invention.

The armature B is arranged in the diagonal XY of a thyristor bridge T$h$I, T$h$II, T$h$I', T$h$II'. The anodes of T$h$I and T$h$II are connected to point P, the cathodes of T$h$I' and T$h$II' to point Q, whereas point X is the junction between the cathode of T$h$I and the anode of T$h$II and point Y the junction between the cathode of T$h$II and the anode of T$h$I'. Across the terminals of each of the thyristors T$h$I, T$h$II, T$h$I', T$h$II' is connected in antiparallel configuration a diode, namely DI, DII, DI' and DII' respectively, in such a way that the diodes conduct in the opposite sense of the said thyristors.

A converter of this type is meant to supply the load B with pulses the amplitude and duration of which control the mean value of the current flowing in the said armature and, thus, the speed of the motor. The duration of the pulses depends, in turn, on the conduction and blocking times of the thyristors supplying the armature. In order to obtain high precision in the control of the motor, it is therefore an essential requirement for the extinction of the thyristors to be rapid so as to obtain a high cut-off frequency.

In the example shown in FIGURE 1 the thyristors T$h$I and T$h$I' control the flow of current to the D.C. motor in one direction, and the thyristors T$h$II and T$h$II' in the other direction. The extinction of these thyristors is achieved by the combined action of the capacitor C$_1$ and the inductor L$_1$.

The inductor L$_1$ is advantageously associated with a single magnetic circuit, and its two coils are tightly coupled therewith, so as to form an autotransformer. If the tapping M is arranged substantially in the centre of L$_1$, the transformation ratio from the primary to the secondary coil is unity.

When the thyristors of the inverter OD are blocked and thyristor T$h$c' is rendered conductive, the capacitor C$_1$ is charged by the direct voltage source up to a value limited to the voltage U of this source, due to the fact that diodes D, DI, DII, DI' and DII' are provided. The thyristor T$h$c' switches off by itself, since the charging current of C$_1$ ceases to flow when the voltage across its terminals has reached the value U.

When the thyristors T$h$I and T$h$I' fire, a current Ic, supplied by the source U, passes through the armature B. When the thyristors T$h$I and T$h$I' are to be rendered non-conductive (an operation which applies equally to T$h$II and T$h$II'), the thyristor T$h$c is rendered conductive. As a result, capacitor C$_1$ will discharge into the winding MO of L$_1$, producing a counter-EMF across the terminals of L$_1$ which isolates the load B from the source U. The counter-EMF thus produces a periodic current $i_1$ opposing Io for which a circuit is made through the source U, the latter presenting a low A.C. impedance owing to the filter capacitors (not shown here) associated with it.

Moreover, a magnetising current Im is set up in L$_1$ which flows in the same direction as Io. Therefore, the current $i$ which flows in the thyristors of the inverter OD equals $$i = Io + Im - i_1$$

$i_1$ being a rising function of C$_1$ and Im a decreasing function of $L_1$. It is thus possible to select $C_1$ and $L_1$ in such a way as to make $i$ zero or negative. In that case, the thyristors $ThI$ and $ThI'$ can be blocked if $i$ remains equal to, or smaller than, zero during a time exceeding their extinction period, that is to say if the time constant $L_1C_1$ is such that the first pseudo-halfwave of current supplied by the resonant circuit $L_1C_1$ has a duration greater than the said extinction period.

It should be noted that, at the time the current $i$ goes negative, it is the diode connected in the opposite sense across the terminals of its associated thyristor in the inverter which becomes conductive and therefore applies a small blocking voltage in the reverse sense which is equal to the direct-voltage drop of the conducting diode.

On $ThI$ and $ThI'$ firing again, the current $Io$ begins to flow again in the armature B. Moreover, as the thyristor $Thc'$ is likewise fired the capacitor $C_1$ is again charged via the winding NM of $L_1$, and thus a counter-EMF is produced across the terminals of $L_1$, isolating the load B from the source U. This counter-EMF produced, in turn, a periodical current $i'_1$ in the winding MO. A circuit for this current, which opposed $Io$, is completed via the diodes $DI$ and $DII'$. Taking into account the magnetising current $Im$ in $L_1$, it will be seen that the current $i'$ flowing through the thyristors equals $$i' = Io + Im - i'_1$$

an equation similar to that written previously wherein $i'_1$ and $Im$ are again a rising function of $C_1$ and a decreasing function of $L_1$ respectively. The turned-on thyristors of the inverter OD can again be extinguished in this way.

Figure 2:
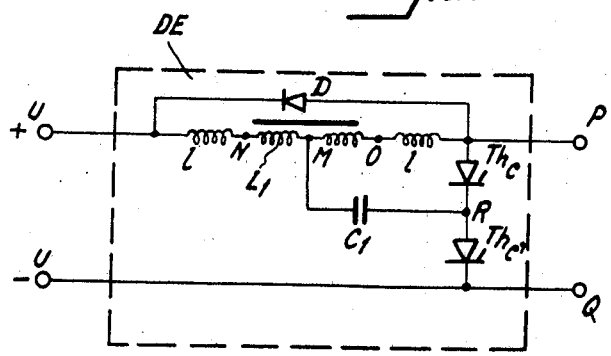
FIGURES 2 and 3 show two examples of extinction devices for converters according to the invention.

Since the above-mentioned currents $Im$, $i_1$ and $i'_1$ depend on the leakage inductors of the autotransformer $L_1$, on the circuit inductor and on the equivalent resistances of the various circuit elements, especially the diodes $DI$ and $DII'$, the switching duration of the converter must depend on these circuit elements. In order to remedy this disadvantage, identical inductors 1 of a value smaller than $L_1$, are connected on either side of the coil $L_1$ and in series therewith, their value being such as to render the influence of the circuit configuration negligible. An embodiment of this type is shown in FIGURE 2. It will be noted that the diode D is connected in parallel with the series circuit composed of inductors $L_1$ and 1.

Figure 3:
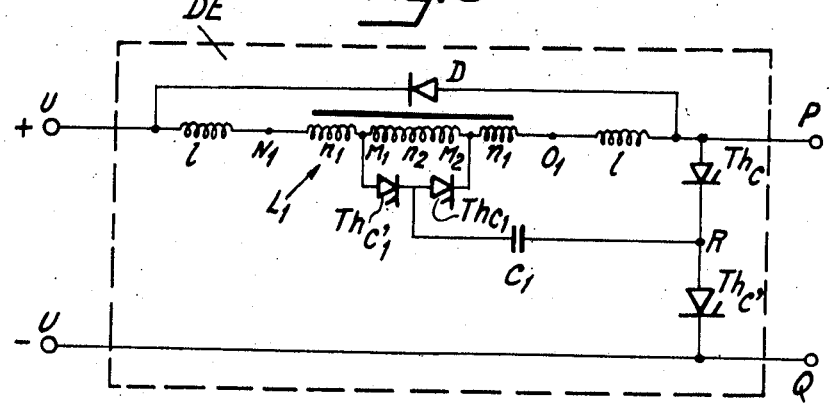

By choosing for the autotransformer $L_1$ a transformation ratio greater than unity it is possible to raise the value of currents $i_1$ and $i'_1$ and thereby to facilitate the extinction of the thyristors in the inverter OD. FIGURE 3 shows an extinction device of this kind. This arrangement is the same as that of FIGURE 2, except for the fact that autotransformer $L_1$ comprises two intermediate tappings $M_1$ and $M_2$, so that the transformer comprises $n_2$ turns within these tappings and $n_1$ turns between each of the tappings and the ends $N_1$ or $O($ respectively of its coil ($n_2$ being larger than $n_1$). The tappings $M_1$ and $M_2$ are connected to one another through thyristors $Thc'_1$ and $Thc_1$, connected in series so as to let their anodes point towards the $+U$ terminal. The common point between thyristors $Thc'_1$ and $Thc_1$ is connected to the capacitor $C_1$. Thyristor $Thc'_1$ is fired simultaneously with $Thc'$, and thyristor $Thc_1$ simultaneously with $Thc$.

Thus, while capacitor $C_1$ is charged, the charge current follows the path $+U$, 1, $M_1$, $Thc'_1$, $C_1$, $Thc'$, $-U$. As a result, the current value $i_1$ is multiplied by the factor $$\frac{n_1 + n_2}{n_1}$$

Similarly, while the capacitor $C_1$ discharges, the discharge current follows the path $C_1$, $Thc_1$, $M_2$ $O_1$, 1, $Thc$, $C_1$ and the transformation ratio is again $$\frac{n_1 + n_2}{n_1}$$

As will be described below, the extinction device DE comprising a single capacitor $C_1$ operates in such a way that the resonant circuit $L_1C_1$ fulfills two functions with every switching operation. The first function consists in isolating the load B to be supplied from the source U, thus avoiding trouble caused otherwise by the short-circuit paths $DI$, $DII'$ and $DII$, $DI'$, whereas the second function is the blocking of the thyristors that had been triggered.

These two functions may be separated from one another in certain cases, either with a view to dimensioning the circuit (see the embodiments described with reference to FIGURE 4 and 5) or for reasons to do with supplying the load (see the embodiments described with reference to FIGURES 6, 7 and 8).

The converter of the invention illustrated in FIGURE 4 comprises a bridge with thyristors $ThA$, $ThB$, $ThA'$ and $ThB'$, connected in such a way that the anodes of $ThA$ and $ThB$ are both connected to point P, whereas the cathodes of $ThA'$ and $ThB'$ are both connected to point Q, and the cathodes of $ThA$ and $ThB$ are connected respectively, at R and S, to the anodes of $ThB'$ and $ThA'$.

The diagonal PQ of this bridge is connected in parallel across a direct-voltage source U with terminals $+U$ and $-U$, point P being connected to the $+U$-terminal via an inductor $L_1$, a return diode D being arranged between the terminals N and O of the latter, whereas point Q is connected directly to the $-U$-terminal.

The inductor $L_1$ is provided with an intermediate tapping M, substantially in the centre, which is connected to point R via a capacitor $C_1$, whereas the diagonal RS of the thyristor bridge comprises a series resonant circuit with a capacitor C and an inductor L. The exact location of point M can be determined by equations for the various transients of the circuit paths relevant to capacitor $C_1$.

This converter supplies across points P and Q an inverter OD resembling that shown in FIGURE 1.

A converter circuit similar to that of FIGURE 4 is already known, with the important difference that it does not comprise either a capacitor $C_1$ or an inductor L, and that the inductor $L_1$ is not provided with an intermediate tapping.

In the known converter the extinction of the thyristors of the inverter OD is obtained merely by the action of capacitor C in combination with the series inductor $L_1$.

In fact, if a command pulse is applied to the control electrodes of thyristors $ThA$ and $ThA'$ of this known device so as to render these thyristors conductive, capacitor C is charged from the direct-voltage source, so that its electrode adjacent point R goes positive. Once the capacitor C is charged, these thyristors stop drawing current spontaneously, since no more current can pass through the capacitor.

If thyristors $ThI$ and $ThI'$ conduct, a current I flowing from X to Y traverses the winding B. When the thyristors $ThB$ and $ThB'$ are rendered conductive so as to extinguish these thyristors, capacitor C discharges through the diodes $DII'$, $DI$ and $DI'$, $DII$. The paths $DI$–$DII'$ and $DII$–$DI'$ form short-circuits between P and Q. Therefore, as long as the thyristors $ThB$ and $ThB'$ continue to pass current the circuit allowing current I to pass through B is limited on one side by $DII$ and $DI$ opposing and, on the other side, by $DII'$ and $DI'$ opposing, owing to the fact that $DI$ and $DI'$ will then be traversed in the forward direction by the discharge current of capacitor C and, moreover, the fact that the voltage U appears across the terminals of $L_1$. Thus, the instantaneous current supplied by the source rises by a certain amount $\Delta I$ which can only be limited by a large $L_1$.

Consequently, the source U continues to supply to the coil B a current $I + \Delta I$ which adds itself to the current I already flowing in the latter. As a result the capacitor C will have to supply a current larger than $2I + \Delta I$ if the voltages appearing across the terminals of $DI$ and $DI'$ are to be high enough to extinguish the thyristors $ThI$ and $ThI'$.

The cut-off capacity of this known converter is thus limited, because a real current $2I+\Delta I$ has to be cut off rather than a current of the magnitude I. Moreover, in order to limit this current rise $\Delta I$, the inductor $L_1$ of this known converter must be high (several mH). However, as regards the supply current, this inductor is in series with the coil B. It must therefore reduce the current drawn by the latter, especially in view of the fact that the inductive load has a smaller time constant at the moment of current flow.

The converter of the invention makes it possible to choose for the inductor $L_1$ a value much lower than that employed in known converters, for it is possible to operate with a given value of $L_1$ and to calculate on the basis of the capacitor $C_1$ a pseudo-cycle for this circuit in dependence on the load placed on the network by $C_1$ and on the latter's discharge via thyristor T$h$A. The values $L_1$ and $C_1$ are chosen in such a way as to let the half-wave of the pseudo-cycle of circuit $L_1C_1$ have a duration substantially equal to that of the cycle of the circuit LC, this duration being slightly greater than the time during which the thyristors are blocked.

In this case, when T$h$B and T$h$B' conduct current, the capacitor $C_1$ is charged from the source U via the thyristor T$h$B' in such a way that the capacitor electrode connected to M goes positive. As has already been mentioned earlier, an EMF which cancels the current flowing in the coil MO or even renders this current negative is set up in the inductor $L_1$ as a result. An inductive load, constituted for example by the motor windings, will then be isolated from the source U and the current through thyristors T$h$I and T$h$I' which must be cut off does not exceed the level I.

Also, when T$h$A and T$h$A' begin to conduct current the capacitor $C_1$ discharges into the coil MO of the inductor $L_1$ and, as a result, the current flowing in NM is temporarily cancelled and the source U isolated from the load during the time $C_1$ discharges. During the same time capacitor C is charged again from source U and the series resonant circuit LC is ready to perform a new quenching operation. It should be noted that during the whole period capacitor C is charged in the opposite direction, the thyristors T$h$A and T$h$A' remain conductive.

Obviously, the operation is the same if the other thyristor pair, i.e., T$h$II and T$h$II', conducts initially.

FIGURE 5 shows a converter according to the invention in which the load is composed, for example, of four coils BI, BII, BIII and BIV of a variable-reluctance motor, the number of these coils not being limited.

The coils BI, BII, BIII and BIV are connected in a ring configuration. The common point of BI and BIV is connected, on the one hand, to point P via a thyristor T$h$I, shunted by a diode DI, and, on the other hand, to point Q via a thyristor T$h$III, shunted by a diode DIII'. Similarly, the common points of BI and BII, BII and BIII, BIII and BIV are connected, on the one hand, to point P by thyristors T$h$II, T$h$III and T$h$IV respectively, shunted by diodes DII, DIII and DIV and, on the other hand, to point Q by thyristors T$h$IV', T$h$I' and T$h$II' respectively, shunted by diodes DIV', DI' and DII'. These coils must be periodically supplied in one direction and then in the other.

For example, when thyristors T$h$I and T$h$I' conduct current, the coils BI and BII are traversed by the same current. The same applies to BIII and BIV, but these two currents will flow in the opposite directions.

In the example shown here, the order of firing the thyristors corresponds to the index number appertaining to their reference symbols for a given sense of motor rotation.

If it is desired to quench the current passing the thyristors while they are conducting, the diodes DI to DIV and DI' to DIV' present short-circuits between the points P and Q, but, as has been explained with reference to FIGURE 1, these short-circuits will not affect the cut-off capacity of the converter, since capacitor $C_1$ isolates the coils from the source during the time the series resonant circuit LC discharges.

The extinction device DE containing only a single capacitor $C_1$, which has been described with reference to FIGURES 1 to 3, is only suitable in conjunction with a source supplying a practically constant direct voltage and cannot be used when this direct voltage varies strongly, as is the case if the load of the inverter OD is composed of the windings of a cynchronous or asynchronous motor whose speed is to be varied within large limits by modifying the supply frequency..

In that case the source tension U must be lowered with the frequency so as to avoid iron saturation in the motor.

It may thus become necessary to vary the tension according to a ratio of 1:20, while the current remains constant if the motor operates with constant torque.

This voltage variation is obtained by measures relating to the supply source which may be a rectifier operating with variable ignition delay, followed by a filter arrangement.

If the quenching of the thyristors of the inverter circuit OD is to be obtained in the above-described manner by a current supplied from an extinction device DE and if the latter is supplied with the same voltage as the inverter, this extinction device, having to furnish a maximum quenching current larger than the motor current with a minimum supply voltage, must produce rather too heavy a current when the supply source applies maximum voltage.

The quenching current supplied by the DE-devices described with reference to FIGURES 1 to 5 is in fact proportional to the supply voltage U. Here, the circuit elments used in the DE-units, in particular the thyristors, and the diodes employed in the inverter, would have to be capable of withstanding very heavy current loads.

The extinction devices DE described with reference to FIGURES 6, 7 and 8 obviate these drawbacks. To achieve the desired result, they comprise, on the one hand, the same assembly $L_1$ 1, $C_1$, T$hc$, T$hc'$ D (supplied by the source U) as the devices described with reference to FIGURE 1 and 3 and, on the other hand, a thyristor bridge T$h$A, T$h$A', T$h$B, T$h$B' (similar to that in FIGURES 4 and 5), one diagonal of this bridge being supplied by a voltage source U' while its other diagonal comprises at laest one capacitor C.

In the circuit arrangement shown in FIGURE 6 the thyristor bridge T$h$A, T$h$A', T$h$B, T$h$B' is arranged between the thyristors T$hc$, T$hc'$ and the terminals P and Q.

The anode of T$h$A is connected to the anode of T$h$B, and the cathode of T$h$B' to that of T$h$A', whereas the cathodes of T$h$A and T$h$B are connected to the anode T$h$B' and T$h$A' respectively. The common point of cathode T$h$A' and T$h$B' is connected to the —U-terminal which is also the negative terminal of the source U', and the common point of anode T$h$A and T$h$B is connected, on the one hand, to point P via a diode $D_4$ passing current from the source U and, on the other hand, to the positive terminal +U' of the source U' via an inductor $L_2$ and a diode $D_3$, this diode passing current from the latter source. The common points of T$h$A and T$h$B' on the one hand, and of T$h$B and T$h$A' on the other, are connected by a series resonant circuit comprising a capacitor C and an inductor L.

The diodes $D_3$ and $D_4$ prevent the sources U and U' from supplying current to each other.

If, for example, the thyristors T$h$A and T$h$A' are ignited, in order to switch the current in the load B by means of the series resonant circuit LC, also the thyristor T$hc'$ is rendered conductive.

Thus, the charge of $C_1$ produces, in the way already described before, a voltage which cancels the current in the coil MO, and this isolates the said load B from the source U.

Similarly, when the next-following switching operation occus, ThA and ThA' (or ThB and ThB') are made to conduct current at the same time as Thc, so that the discharge of $C_1$ isolates the load B again from the source U.

Obviously, the ignition times of thyristors ThA and ThA' (or ThB and ThB') and those of thyristors Thc or Thc', as also the time constants $L_1C_1$ and LC, are chosen such that the load B is reliably isolated during every switching operation. Moreover, it is necessary for the time constant of the series resonant circuit LC to be such that the first halfwave of current delivered by this series resonant circuit has a duration greater than the quenching time of the rectifiers ThI, ThI', ThII, ThII'. The circuit 1, $L_1$, $C_1$ is chosen such that the halfwave of its pseudo-cycle is substantially equal to that of the cycle of LC.

In the device shown in FIGURE 6, the inductor $L_2$ limits the rise of current supplied from the source U' when the resonant circuit LC switches the thyristors of the inverter OD and, consequently, the voltage across its terminals is zero.

If the current absorbed by the load D is high and also if the switching frequency is high, the inductor $L_2$ may delay the charging of the series resonant circuit LC to an undesirable degree.

The device DE shown in FIGURE 7 obviates this disadvantage. It resembles the circuit arrangement of FIGURE 6, but the inductor $L_2$ and the diode $D_3$ are replaced by an inductor $L_3$ of low value (which may even be zero) and by a thyristor Thu', a capacitor $C_2$ shunting the whole thyristor bridge. This thyristor Thu' only fires every time the switching operation of the resonant circuit LC has terminated, so that C is recharged from U', thus compensating the losses caused by every switching operation. The purpose of the resonant circuit $L_3C_2$ is to diminish the variation in time of the voltage applied across the terminals of thyristor Thu' during the switching operation, a variation which might lead to the inadvertent ignition of this thyristor.

The device of FIGURE 8 resembles that of FIGURE 6 and it works in the same way as the latter, except that the inductor L is no longer in the diagonal of the thyristor bridge, but arranged between the cathode of diode $D_4$ and the anodes of ThA and ThB', the capacitor $C_2$ being inadvertent ignition of this thyrstor.

Obviously, in this way it becomes possible, thanks to the converter disclosed by the present invention, to supply any electric device comprising one or more coils and, in particular, inverters for different types of motor.

Moreover, as can be gathered from the present description, the converter of the invention enables the energy required for the switching of cyclically interrupted current to be reduced, whereas the permissible switching frequency is raised. Under these conditions it becomes possible to control the mean current traversing each coil by cutting the supply voltage during each conducting period of the latter.

We claim:
1. An D.C.-A.C. converter comprising:
  (a) an inverter network of semiconductor controlled rectifiers, said network having input and output leads,
  (b) an extinction circuit having a series of inductor with a first terminal connected to a first of said inverter input leads, a second terminal connected to one of a pair of D.C. supply terminals, and an intermediate tapping, and
  (c) a first capacitor having a first terminal connected to said intermediate tapping of said inductor and a second terminal connected via a first semicoductor switch to said one inverter input lead and via a second semiconductor switch to the other of said pair of D.C. supply terminals.

2. A converter according to claim 1 wherein the two portions of the inductor defined by said intermediate tapping are tightly coupled magnetically, and wherein each of said semiconductor switches comprises a single semiconductor controlled rectifier, said second terminal of said capacitor being joined to a common point between said two semiconductor switches.

3. A converter according to claim 2 wherein the semiconductor controlled rectifiers of said inverter network have a given quenching time, and wherein said capacitor and said inductor define a resonant circuit having a first pseudo-halfwave duration parameter greater than said quenching time.

4. A converter according to claim 1 wherein two identical auxiliary inductors of a valve smaller than that of said series inductor are connected in series respectively with said first and second terminals of said series inductor.

5. A converter according to claim 1 wherein said series inductor is provided with a further intermediate tapping, said two intermediate tappings being connected to one another by two unidirectional elements in series, wherein said two intermediate tappings define between them a greater number of inductor turns than are present in either of two equal inductor portions defined respectively between said two intermediate tappings and said first and second terminals of said inductor, and wherein said first terminal of said first capacitor is connected to a common point between said two unidirectional elements.

6. A converter according to claim 1 wherein said first and said second semiconductor switches are provided in the form of a bridge composed of four semiconductor controlled rectifiers, said bridge having a first diagonal which is connected in series with said series inductor and said pair of D.C. supply terminals, and a second diagonal including a second capacitor, and wherein said second terminal of said first capacitor is connected to one end of said second diagonal of said bridge.

7. A converter according to claim 6 wherein an additional inductor is arranged in series with said second capacitor in said second bridge diagonal, and wherein the semiconductor controlled rectifiers of said inverter network have a given quenching time, said second capacitor and said additional inductor defining a resonant circuit having a first pseudo-halfwave duration parameter greater than said quenching time.

8. A converter according to claim 7 wherein said series inductor and said first capacitor define a resonant circuit having a first pseudo-halfwave duration parameter of greater duration than the first pseudo-cycle duration parameter of said additional inductor, said parameter being slightly greater than said given quenching time.

9. A converter according to claim 1 wherein said D.C. supply is of variable magnitude and incorporates a supplementary constant D.C. source, said extinction circuit comprising, on the one hand, a series chain of two controlled semiconductor elements connected between said first terminal of said series inductor and said other of said pair of D.C. supply terminals, said first capacitor being connected between the common point between said controlled semiconductor elements and said tapping of said series inductor and, on the other hand, located between the said two controlled semiconductor elements and the inverter, a bridge comprising four controlled semiconductor elements connected in conducting relation both to said D.C. supply and said supplementary source, a first diagonal of said bridge being connected across said variable supply and supplementary source via corresponding unidirectional elements, a second diagonal of said bridge including at least a second capacitor in series therein.

10. A converter according to claim 9 wherein the semi-conductor controlled rectifiers of said inverter network have a given quenching time, and wherein an additional inductor is connected in series with said second capacitor thereby defining a resonant circuit having a first pseudo-halfwave duration parameter greater than said quenching time.

11. A converter according to claim 10 wherein an additional inductor is arranged in series with the second capacitor, the time constant of the serise resonant circuit thus formed being such that the first halfwave of the pseudo-cycle of current delivered in use by this resonant circuit has a duration greater than the quenching time for the controlled rectifiers of the inverter network.

12. A converter according to claim 9 wherein said first bridge diagonal is connected to said supplementary source via a series chain consisting of a diode and a further inductor.

13. A converter according to claim 9 wherein said first bridge diagonal is connected to said supplementary source via a controlled rectifier.

14. A converter according to claim 10 wherein said additional inductor is connected in series with said second capacitor in said second diagonal of said bridge.

15. A converter according to claim 10 wherein said additional inductor is connected in series with said bridge, taken as a whole.

16. A converter constructed in accordance with the features of claim 13, wherein a decoupling capacitor shunts said bridge.

17. A converter constructed in accordance with the features of claim 14, wherein a decoupling capacitor shunts said bridge.

18. A converter constructed in accordance with the features of claim 13 wherein a decoupling capacitor shunts said bridge and said additional inductor.

19. A converter constructed in accordance with the features of claim 15 wherein a decoupling capacitor shunts said bridge and said additional inductor.

References Cited

UNITED STATES PATENTS

| | | | |
|---|---|---|---|
| 3,219,905 | 11/1965 | Davis et al. | |
| 3,262,036 | 7/1966 | Clarke et al. | |
| 3,263,153 | 7/1966 | Lawn | 321—45 |
| 3,321,697 | 5/1967 | Etter | 321—45 |
| 3,340,453 | 9/1967 | Bradley et al. | |
| 3,379,955 | 4/1968 | Koetsch | 321—45 |
| 3,388,310 | 6/1968 | Etter | 321—45 XR |
| 3,408,551 | 10/1968 | Kuba | 321—45 XR |

LEE T. HIX, Primary Examiner

W. M. SHOOP, JR., Assistant Examiner